United States Patent

Motomatsu et al.

[11] Patent Number: 5,808,833
[45] Date of Patent: Sep. 15, 1998

[54] MAGNETIC DISK APPARATUS WITH PROTECTIVE FILMS

[75] Inventors: Toshihiko Motomatsu; Hiroshi Kawahara, both of Tokyo, Japan

[73] Assignee: NEC Corporation, Tokyo, Japan

[21] Appl. No.: 842,772

[22] Filed: Apr. 17, 1997

[30] Foreign Application Priority Data

Apr. 26, 1996 [JP] Japan .................................. 8-106855

[51] Int. Cl.⁶ ..................................................... G11B 5/60
[52] U.S. Cl. .............................................................. 360/103
[58] Field of Search ............................................. 360/103

[56] References Cited

U.S. PATENT DOCUMENTS 5,673,161  9/1997  Yanagisawa ............................ 360/103

FOREIGN PATENT DOCUMENTS 3-120610  5/1991  Japan .
5-002730  1/1993  Japan .

OTHER PUBLICATIONS

M. Yanagisawa, "Tribological Properties of Spin–Coated $SiO_2$ Protective Film on Plated Magnetic Recording Disks", *Tribology and Mechanics of Magnetic Storage Systems*, vol. II, 1985, pp. 21–26.

*Primary Examiner*—A. J. Heinz
*Attorney, Agent, or Firm*—Young & Thompson

[57] ABSTRACT

A magnetic disk apparatus includes a magnetic disk medium and a magnetic head. The magnetic disk medium has a surface layer formed with an $SiO_2$ protective film. The magnetic head reads/writes data from/on the magnetic disk medium by contact, start, and stop operations. The magnetic head has a slider having an air bearing surface, a magnetic head element supported by the slider, and an ABS protective film formed on the air bearing surface of the slider.

5 Claims, 3 Drawing Sheets

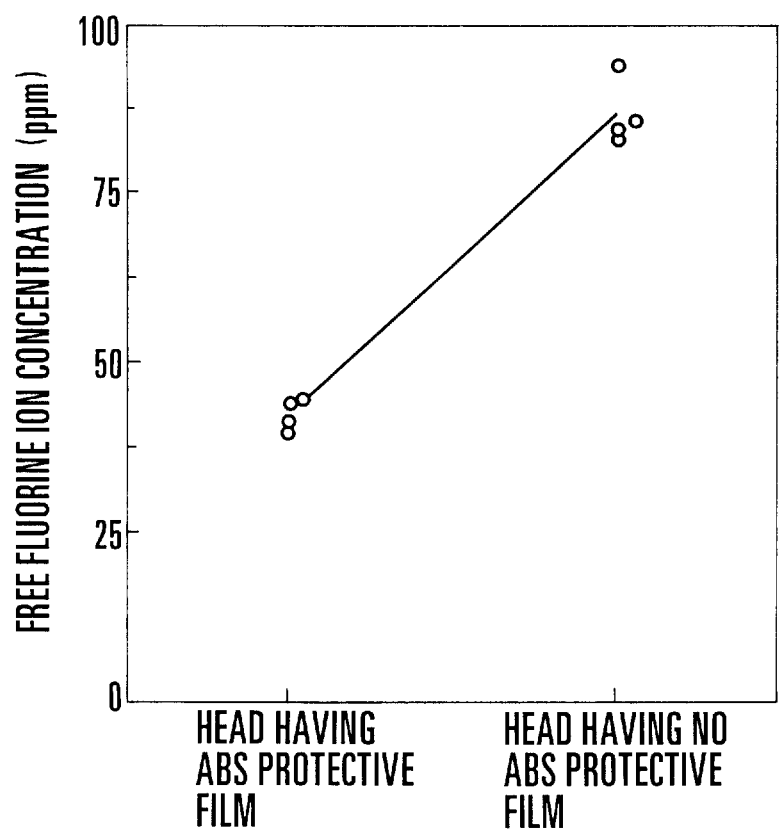
F I G. 5

MAGNETIC DISK APPARATUS WITH PROTECTIVE FILMS

BACKGROUND OF THE INVENTION

The present invention relates to a magnetic head slider integrally formed with a magnetic head and, more particularly, to a magnetic disk apparatus on which a magnetic disk medium having an $SiO_2$ (silicon dioxide) film as a protective film is loaded.

In recent years, the distance between the magnetic head and the magnetic disk has decreased in order to realize a higher packaging density in a magnetic disk apparatus. In this case, in contact, start, and stop (to be referred to as CSS hereinafter) operations, a magnetic head slider transiently slides on the magnetic disk. Therefore, wear of and damage to the protective film of the magnetic disk poses a problem.

In a conventional magnetic disk apparatus, in order to protect the magnetic disk from mechanically wearing due to contact between the magnetic head and the magnetic disk during the CSS operations, various types of protective film layers are formed on the ABS (Air Bearing Surface) of the magnetic head, or the main material of a magnetic head slider is devised.

For example, Japanese Patent Laid-Open No. 3-120610 discloses a method of forming a protective film for a slider in a magnetic recording disk file in which a disk interlocked with the slider has a protective film essentially consisting of carbon. Japanese Patent Laid-Open No. 5-2730 discloses the main material of a magnetic head slider which is used in combination with a magnetic disk having a surface layer formed with a protective film essentially consisting of carbon.

In any conventional example, a magnetic disk apparatus loaded with a magnetic disk formed with a protective film essentially consisting of carbon is described, and no conventional example is available concerning a magnetic disk apparatus loaded with a magnetic disk medium having an $SiO_2$ film as a protective film.

The first problem of a magnetic disk apparatus loaded with a magnetic disk medium having an $SiO_2$ film as a protective film is that the $SiO_2$ protective film of the magnetic disk medium often causes peeling due to the CSS operations. Also, when the magnetic head slider excessively slides on the magnetic disk medium, scratching occurs on the $SiO_2$ protective film. Since the ABS of the employed magnetic head is not formed with a protective film, the $SiO_2$ protective film is worn or damaged and leads to head crash, thus causing scratching.

The second problem of the magnetic disk apparatus loaded with the magnetic disk medium having the $SiO_2$ film as the protective film is the degradation of the medium lubricant caused by the seek operation. Since the ABS of the employed magnetic head is not formed with a protective film, the slide energy generated between the magnetic head slider surface and the $SiO_2$ protective film is high. The heat of the slide energy and the energy caused by collision decompose the components of the lubricant, thus causing degradation. In other words, when the lubricant starts to degrade, the slide characteristics of the magnetic disk medium degrade, causing wear to the magnetic disk medium. Then, worn particles and slide traces are generated, causing troubles leading to head crash.

SUMMARY OF THE INVENTION

It is an object of the present invention to provide a magnetic disk apparatus in which, when an $SiO_2$ film is formed as the protective film of a magnetic disk medium, peeling of the $SiO_2$ protective film from the magnetic disk medium, scratching of the magnetic disk medium, and degradation of the lubricant of the magnetic disk medium are suppressed.

In order to achieve the above object, according to the present invention, there is provided a magnetic disk apparatus comprising a magnetic disk medium having a surface layer formed with an $SiO_2$ protective film, and a magnetic head for reading/writing data from/on the magnetic disk medium by contact, start, and stop operations, wherein the magnetic head has a slider having an air bearing surface, a magnetic head element supported by the slider, and an ABS protective film formed on the air bearing surface of the slider.

BRIEF DESCRIPTION OF THE DRAWINGS

FIG. 5 is a graph showing the result obtained by measuring the free fluorine ion concentration of the magnetic disk medium lubricant concerning the magnetic disk apparatus of the present invention.

DESCRIPTION OF THE PREFERRED EMBODIMENT

The present invention will be described in detail with reference to the accompanying drawings.

Figure 2:
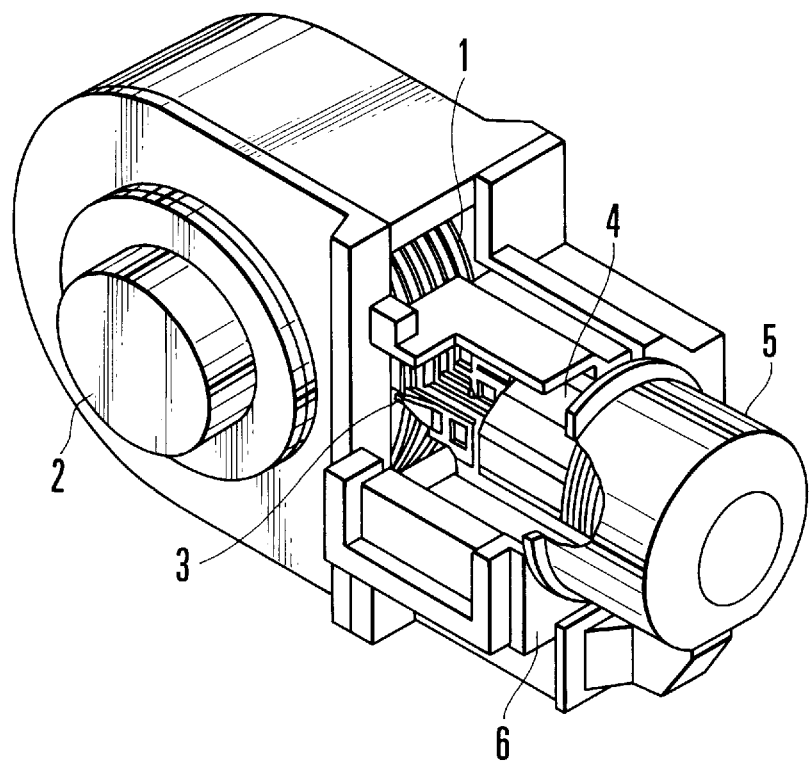
FIG. 2 is a schematic perspective view of a magnetic disk apparatus according to an embodiment of the present invention.

FIG. 2 shows a magnetic disk apparatus according to an embodiment of the present invention. Referring to FIG. 2, this magnetic disk apparatus has a plurality of data recording magnetic disk media 1, a spindle motor 2, a magnetic head 3, an actuator 4, a voice coil motor 5, and an air filter 6. The magnetic disk media 1 are stacked at a predetermined distance from each other. The spindle motor 2 rotates the magnetic disk media 1. The magnetic head 3 reads/writes data from/on the magnetic disk media 1. The actuator 4 and the voice coil motor 5 support the magnetic head 3 and position the magnetic head 3 at the target position of the magnetic disk media 1. The air filter 6 keeps the interior of the magnetic disk apparatus clean. The magnetic disk media 1 are plated magnetic disk media, and the surfaces of their magnetic plating films are coated with $SiO_2$ protective films.

Figure 1:
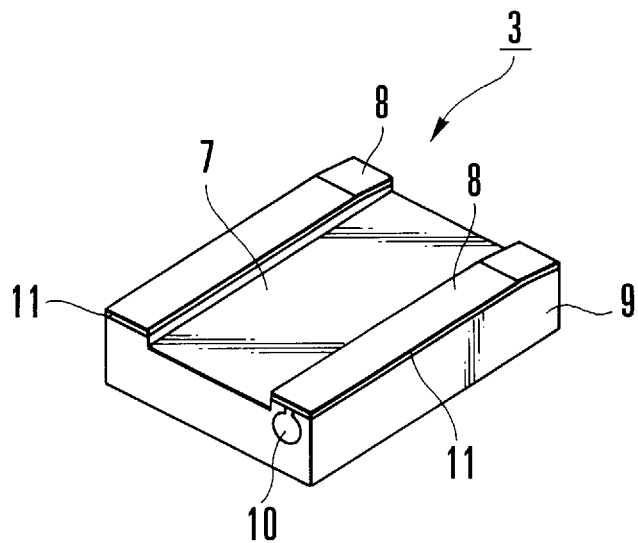
FIG. 1 is a schematic perspective view of a magnetic head shown in FIG. 2.

FIG. 1 schematically shows the magnetic head 3 shown in FIG. 2. Referring to FIG. 1, the magnetic head 3 is constituted by a slider 9 and a magnetic head element 10 supported by the slider 9. A groove portion 7 is formed in one major surface of the slider 9 opposing the magnetic disk media 1, and a pair of slider rails 8 are formed on the two sides of the groove portion 7. The magnetic head element 10 is formed on one trailing surface of the slider rails 8 by the thin film technique. An ABS protective film 11 having a predetermined thickness is formed on the entire surface of each slider rail 8 opposing the magnetic disk media 1 including a front inclined surface. The ABS protective film 11 formed on each slider rail 8 is made of a hydrogen-containing carbon film, and is formed by sputtering or CVD (Chemical Vapor Deposition).

Each magnetic disk medium 1 having the SiO$_2$ film as the protective film gives a lower slide energy to the ABS of the magnetic head 3 than does a magnetic disk medium having a carbon film as the protective film. Thus, the magnetic head 3 including the protective film can maintain a longer service life. The magnetic disk medium 1 is combined with the magnetic head 3 having an ABS film formed with a carbon protective film, as in the present invention, and this prolongs the service life of the magnetic disk medium 1 including the protective film. As a result, the magnetic disk apparatus loaded with the magnetic disk media 1 having the SiO$_2$ films as the protective films and the magnetic head 3 having the ABS coated with the protective film has good slide characteristics.

Preferable conditions of the protective film of the magnetic disk medium 1 and the ABS protective film 11 of the magnetic head 3 when practicing the present invention are, for example, as follows.

As the protective film of the magnetic disk medium 1, an SiO$_2$ film formed on a magnetic plating layer (CONiP layer) in accordance with the following conditions is used:

film thickness of SiO$_2$: 150 to 300 Å

As the ABS protective film 11 of the magnetic head 3, an SiO$_2$ underlying film and a carbon film formed in accordance with the following conditions are used. The SiO$_2$ underlying film and the carbon film are formed on the slider rails 8 made of AlTiC and the magnetic head element made of Al$_2$O$_3$ by sputtering or CVD.

thickness of SiO$_2$ underlying film: 20 to 50 Å thickness of carbon protective film: 30 to 100 Å content rate of hydrogen: about 4 to 37 atomic %

Figure 3:
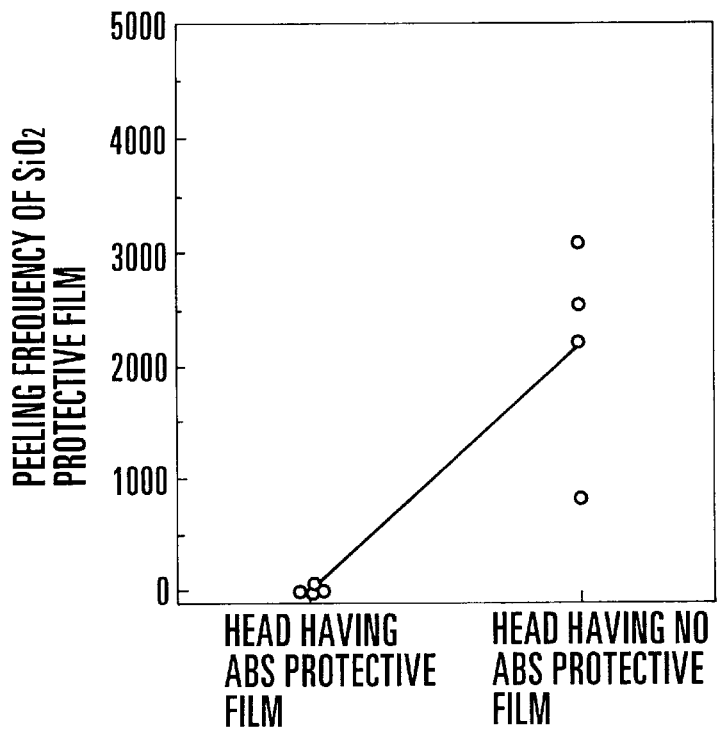
FIG. 3 is a graph showing the result of CSS durability test concerning the magnetic disk apparatus of the present invention.
Figure 4:
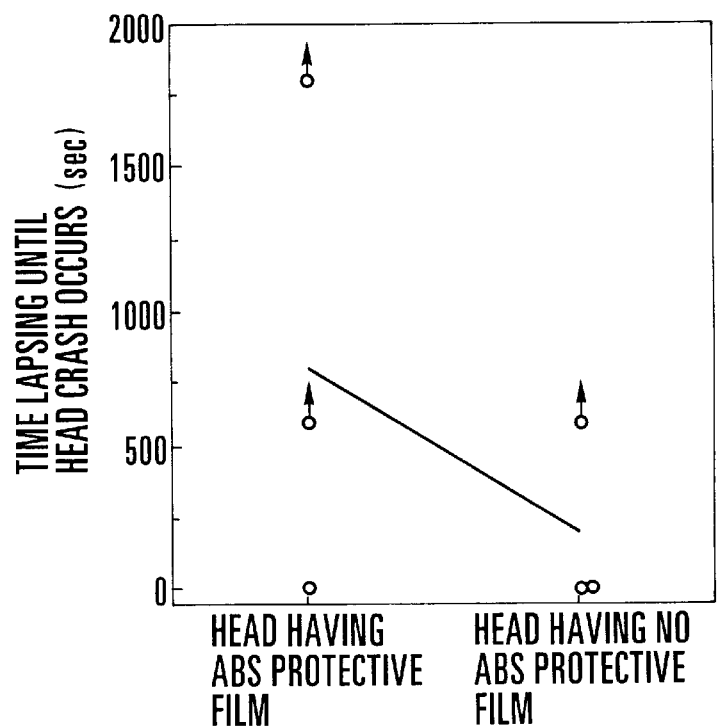
FIG. 4 is a graph showing the result of high-speed slide test concerning the magnetic disk apparatus of the present invention.

(gas flow rate of hydrogen in processing: 0 to 40%);

A single-disk evaluation concerning the magnetic disk apparatus of the present invention was performed. FIGS. 3 to 5 show the evaluation result. The measurement conditions are as follows.

As the protective film of the magnetic disk medium 1, an SiO$_2$ film formed on a magnetic plating layer (CoNiP layer) in accordance with the following conditions is used:

thickness of SiO$_2$ film: 150 to 300 Å

As the ABS protective film 11 of the magnetic head 3, an SiO$_2$ underlying film and a carbon film formed in accordance with the following conditions are used. The SiO$_2$ underlying film and the carbon film are formed on the slider rails 8 made of AlTiC and the magnetic head element 10 made of Al$_2$O$_3$ by sputtering or CVD.

thickness of SiO$_2$ underlying film: 20 Å thickness of carbon protective film: 80 Å content rate of hydrogen: about 37 atomic %

(gas flow rate of hydrogen in process: 20%).

FIG. 3 shows the result of CSS durability test conducted on a magnetic disk medium having an SiO$_2$ film as the protective film. As is apparent from FIG. 3, with the magnetic head 3 having the ABS protective film 11, the peeling frequency of the SiO$_2$ protective film of the magnetic disk medium greatly decreases when compared to the peeling frequency obtained with the magnetic head having no ABS protective film.

FIG. 4 shows the result of high-speed slide test conducted on a magnetic disk medium having an SiO$_2$ film as the protective film. As is apparent from FIG. 4, with the magnetic head 3 having the ABS protective film 11, a time that lapses until head crash (H/C) occurs becomes longer than that with the magnetic head having no ABS protective film, so that scratching and generation of worn particles are suppressed.

FIG. 5 shows the result obtained by measuring the free fluorine ion concentration of a lubricant for a magnetic disk medium having an SiO$_2$ film as the protective film. The free fluorine ion concentration of the medium lubricant after the seek operation with the magnetic head having the ABS protective film and that with the magnetic head not having the ABS protective film were analyzed. As is apparent from FIG. 5, with the magnetic head 3 having the ABS protective film 11, the free fluorine ion concentration becomes ½ or less that obtained with the magnetic head having no ABS protective film. A decrease in free fluorine ion concentration means that decomposition and degradation of the lubricant are suppressed.

As has been described above, according to the present invention, since the peeling frequency of the SiO$_2$ protective film of the medium of the magnetic disk apparatus largely decreases to suppress scratching and generation of worn particles, the CSS durability, the slide characteristics, and the effect of suppressing degradation of the lubricant can be greatly improved. As a result, a magnetic disk apparatus not causing head crash easily and having a high reliability and a long service life can be provided.

What is claimed is:

1. A magnetic disk apparatus comprising:

a magnetic disk medium having a surface layer formed with an SiO$_2$ protective film; and a magnetic head for reading/writing data from/on said magnetic disk medium by contact, start, and stop operations, wherein said magnetic head has a slider having an air bearing surface, a magnetic head element supported by said slider, and an ABS protective film formed on said air bearing surface of said slider, said ABS film being a hydrogen-containing carbon film.

2. An apparatus according to claim 1, wherein said SiO$_2$ protective film of said magnetic disk medium has a thickness of 150 Å to 300 Å, and said carbon film forming said ABS protective film has a thickness of 50 Å to 100 Å.

3. An apparatus according to claim 1, wherein said carbon film forming said ABS protective film has a hydrogen content rate of about 4 to 37 atomic %.

4. An apparatus according to claim 1, wherein said carbon protective film is formed to have a predetermined thickness by using one of sputtering and chemical vapor deposition.

5. An apparatus according to claim 1, wherein said slider has a pair of slider rails formed on two side portions of a surface thereof opposing said magnetic disk medium, and said ABS protective film is formed on entire surfaces of said slider rails that form said air bearing surface of said slider.

* * * * *